US000001870H

United States Statutory Invention Registration [19]

[11] Reg. Number: H1,870

Mizata et al.

[45] Published: Oct. 3, 2000

[54] TIRE WHEEL

[75] Inventors: Shuichi Mizata; Moriaki Inagaki, both of Aichi, Japan

[73] Assignee: Inoac Corporation, Nagoya, Japan

[21] Appl. No.: 08/974,603

[22] Filed: Nov. 19, 1997

Related U.S. Application Data

[63] Continuation of application No. 08/580,387, Dec. 28, 1995.

[30] Foreign Application Priority Data

Apr. 3, 1995 [JP] Japan ..... 7-103028
Jun. 16, 1995 [JP] Japan ..... 7-173985

[51] Int. Cl.[7] ..... B60C 7/00
[52] U.S. Cl. ..... 152/310
[58] Field of Search ..... 152/310–314, 152/318, 157, 158

[56] References Cited

U.S. PATENT DOCUMENTS

| | | | |
|---|---|---|---|
| 1,193,196 | 8/1916 | Sherbondy | 152/313 |
| 3,022,810 | 2/1962 | Lambe | 152/310 |
| 3,195,601 | 7/1965 | Travers | 152/313 |
| 3,208,497 | 9/1965 | Schutt | 152/313 |
| 3,381,735 | 5/1968 | Talcott et al. | 152/313 |
| 3,915,774 | 10/1975 | Dobson | 152/313 |
| 4,909,972 | 3/1990 | Britz | 152/310 |

FOREIGN PATENT DOCUMENTS

| | | | |
|---|---|---|---|
| 1936526 | 3/1970 | Germany | 152/313 |
| 51-112003 | 3/1976 | Japan . | |
| 56-8764 | 2/1981 | Japan . | |
| 183088 | 7/1922 | United Kingdom | 152/313 |
| 1053853 | 1/1967 | United Kingdom | 152/313 |
| 2047637 | 12/1980 | United Kingdom | 152/313 |

*Primary Examiner*—Charles T. Jordan
*Assistant Examiner*—Meena Chelliah
*Attorney, Agent, or Firm*—Sughrue, Mion, Zinn, MacPeak & Seas, PLLC

[57] ABSTRACT

A tire wheel, is described, which comprises a tire shell having bead parts, a rim on which the tire shell is supported with the bead parts being pressed against the rim, and a filling material with which the ring-form inner space surrounded by the rim and the tire shell is filled, said filling material having an apparent specific gravity of from 0.08 to 0.3 and an impact resilience of from 50 to 80 (as determined by JIS K-6301) in a free state, consisting of an elastic foam containing butyl rubber or a halogenated butyl rubber and having a closed-cell structure with a water absorption as determined by the water absorption test prescribed in ASTM D1056 of 5% or lower, and being in a compressed state.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TIRE WHEEL

This is a Continuation of Application No. 08/580,387 filed Dec. 28, 1995.

FIELD OF THE INVENTION

The present invention relates to a tire wheel having a filling material with which a inner space surrounded by a rim and a tire shell is filled, i.e., a so-called puncture-free tire. This tire wheel is utilized mainly in bicycles and the like.

BACKGROUND OF THE INVENTION

Bicycles are used as convenient means of transit. However, the trouble is that commuters or day students may be visited by sudden puncture. Another trouble is that they need to frequently fill air into inner tubes. Accordingly, a request of being released from maintenance of tire wheels grows bigger and bigger. Further, there is a growing tendency to use bicycles at a state of emergency such as an earthquake disaster.

Under these circumstances, tire wheels commonly called puncture-free tires have come to be investigated which, for example, comprise a solid tire in place of a tube-containing tire or a tire having a rubber foam with which the tube-containing part is filled. Structures of such tire wheels have been proposed since long ago. For example, JP-B-U-40-11446, JP-A-47-26476, and JP-A-57-155101 disclose a technique of producing a puncture-free tire wheel by filling the space of a tire body with an elastomer, a soft rubber layer, etc. (The term "JP-B-U" and "JP-A" as used herein mean an "examined Japanese utility model publication" and an "unexamined published Japanese patent application", respectively.)

However, the conventional tire wheels called puncture-free tires have a drawback that the filling material has a large specific gravity (usually not smaller than 0.4) and this makes the tire wheels heavy and difficult to handle, although puncture mending can be avoided.

Another drawback of those conventional tire wheels is that because the hardness of the solid rubber or rubber foam is usually as high as 40 degrees or higher, the bicycles employing the conventional wheels have poor shock absorption during riding and hence are uncomfortable to ride on. The hardness of a solid rubber herein means the type A hardness prescribed in JIS K-6301, while the hardness of a rubber foam herein means the ASKER type C hardness prescribed in Japan Rubber Association Standards SRIS-0101.

A further drawback is that since the conventional tires have a low impact resilience of lower than 50 (as determined by JIS K-6301), they have high rolling resistance and this makes bicycle riding laborious.

Because of the drawbacks described above, those proposed ideas have failed to be put to wide practical use.

Although a puncture-free tire containing a polyurethane or ethylene-propylene-diene rubber (EPDM) sponge fitted into a tire body has, of course, been put to practical use, this sponge-filled tire is still insufficient in the mitigation of the above-described drawbacks and is inferior to air-filled tires because of these problems. Even if the sponge fitted into the inner space of tire body is a closed cell type one, when the sponge is made from a material such as EPDM, air leakage from the closed cells is apt to occur.

SUMMARY OF THE INVENTION

An object of the present invention is to provide a tire wheel which, although having a puncture-free structure, is lightweight and comfortable to ride on, has low rolling resistance, and can maintain these performances over long. The tire wheel of this invention therefore eliminates the problems described above and can be put to wide practical use.

The first essential aspect of the present invention resides in a tire wheel comprising a tire shell having bead parts, a rim on which the tire shell is supported with the bead parts being pressed against the rim, and a filling material with which the ring-form inner space surrounded by the rim and the tire shell is filled, said filling material having an apparent specific gravity of from 0.08 to 0.3 and an impact resilience of from 50 to 80 (as determined by JIS K-6301) in a free state, consisting of an elastic foam containing butyl rubber or a halogenated butyl rubber and having a closed-cell structure with a water absorption as determined by the water absorption test prescribed in ASTM D1056 of 5% or lower, and being in a compressed state.

The term "apparent specific gravity" herein means the apparent specific gravity of a filling material which is kept in a free state at the atmospheric pressure without applying any external compressive force thereto.

The second aspect of the present invention resides in the tire wheel according to the first aspect in which the filling material is a ring-form elastic foam, and is in a compressed state at a degree of compression of from 10% to 50%.

The term "degree of compression" means the percentage of {[(original volume)-(volume after compression)]/(volume after compression)}.

The third aspect of the present invention resides in the tire wheel according to the first or second aspect in which the surface of the filling material is covered with cell-free thin rubber layer.

DETAILED DESCRIPTION OF THE INVENTION

Since the tire wheel according to the present invention contains a filling material fitted into the inner space thereof, which filling material has an apparent specific gravity of from 0.08 to 0.3 and a free-state impact resilience of from 50 to 80 (as determined by JIS K-6301) and consists of an elastic foam, it not only is capable of sufficiently elastically deforming to shocks, but also is lightweight and has almost satisfactory handleability.

Furthermore, since the filling material is a closed cell elastic foam having a water absorption as determined by the water absorption test prescribed in ASTM D1056 of 5% or lower (so-called closed cell type elastic foam), air leakage is less apt to occur and cushioning properties are maintained. In particular, in the case where the filling material used in this invention is an elastic foam containing butyl rubber or a halogenated butyl rubber, the tire wheel takes advantage of the low gas permeability characteristic of the rubber, so that it can retain over a long period of time the comfortable ride feeling attributable to closed-cell elastic foams.

The term "closed cells" in a foam herein means cells which are separated by walls and are not interconnected. In contrast to such closed cells, there are cells called "open cells," which means cells interconnected through walls having holes or cells separated by a framework only.

Moreover, since the filling material with which the inner space is filled is in a compressed state, the gas enclosed in the closed cells is compressed and this brings about an increased impact resilience and reduced rolling resistance. As a result, the tire wheel comes to have reduced running resistance to provide bicycles which can be ridden on lightly.

The tire wheel according to the second aspect of the invention, in which the filling material has been formed beforehand into a ring form so as to fit into the inner space, is free from troubles encountered in the case of using a filling material obtained by bending a rod-shaped body into a ring form, e.g., free from a gap appearing around the butted ends. In addition, when the filling material fitted into the inner space is preferably in a compressed state at a degree of compression of from 10% to 50%, moderate hardness is obtained along with satisfactory cushioning properties.

The tire wheel according to the third aspect of the invention, in which the surface of the filling material is covered with cell-free thin rubber layer, is almost free from air leakage from the inside of the filling material and retains air over a long period of use.

(1) Constitution of Tire Wheel

Figure 1:
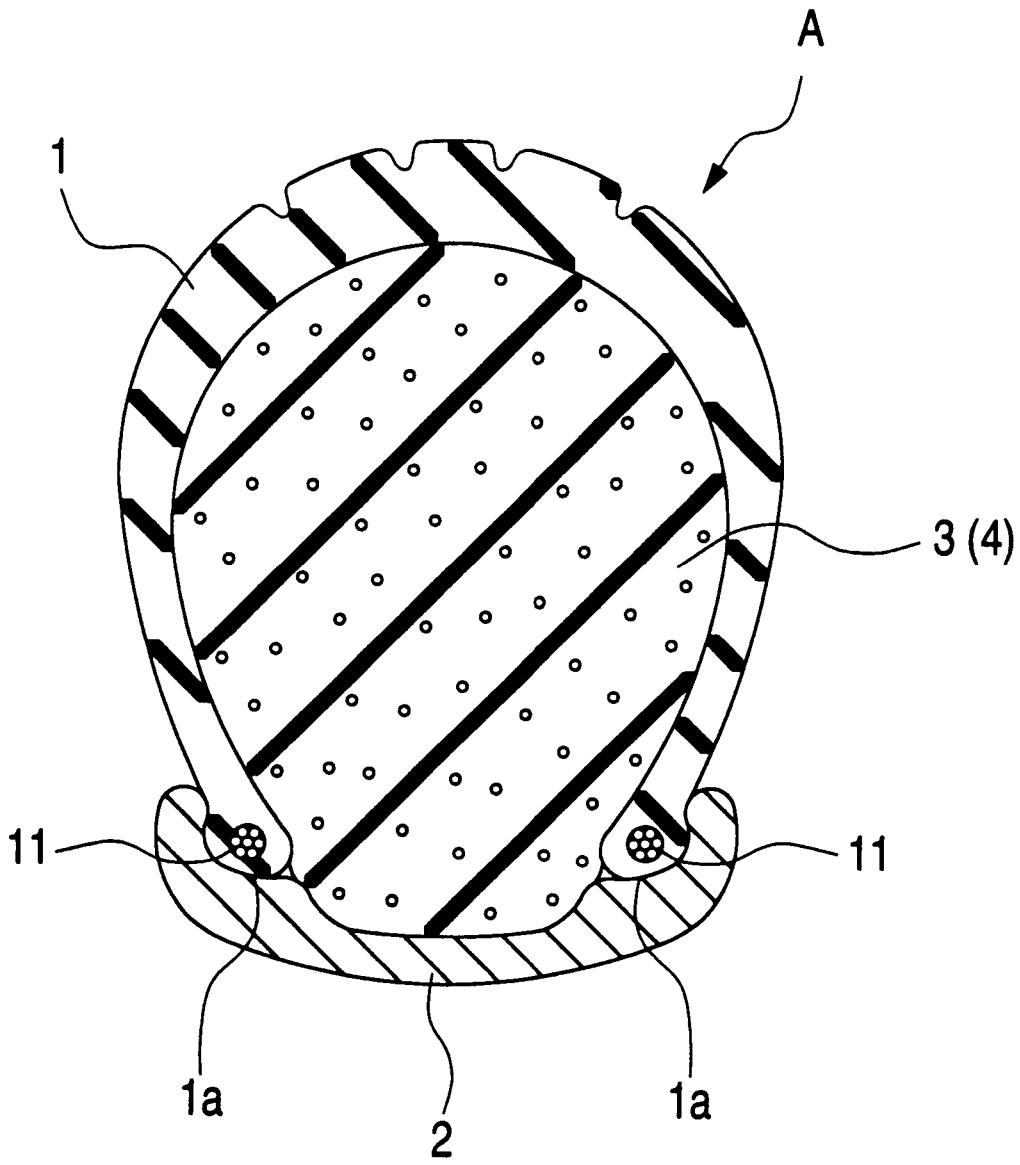
FIG. 1 is a sectional view illustrating part of a tire wheel having a filling material fitted into the inner space surrounded by a tire shell and a rim.
Figure 2:
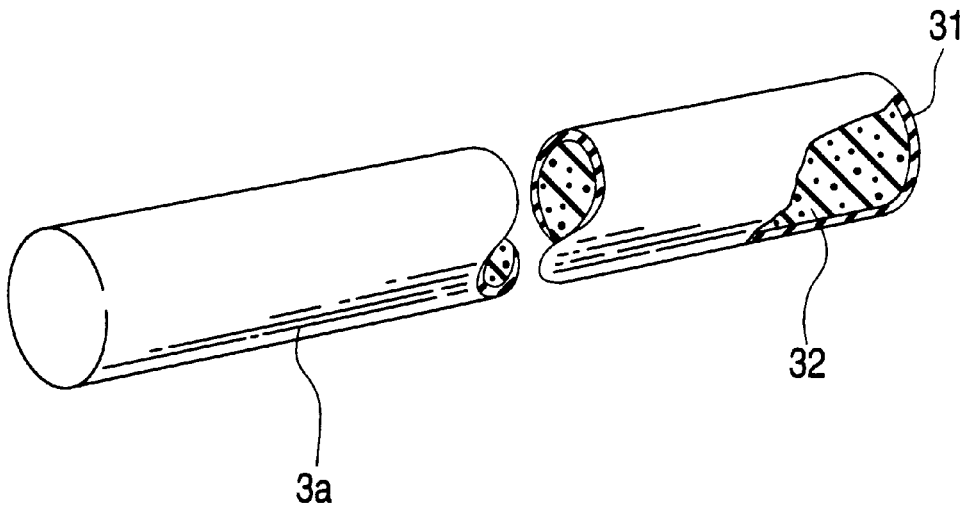
FIG. 2 is a partly sectional slant view of a semifinished part for the filling material.
Figure 3:
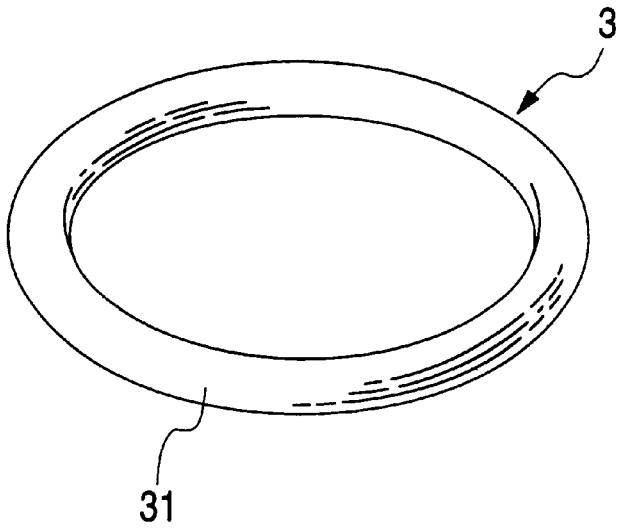
FIG. 3 is a slant view of the filling material.

FIGS. 1 to 3 show an embodiment of the tire wheel according to the present invention. FIG. 1 is a sectional view illustrating part of the tire wheel having a filling material fitted into the inner space surrounded by a tire shell and a rim in a compressed state. FIG. 2 is a slant view of a semi-finished part for the filling material. FIG. 3 is a slant view of the filling material. This embodiment is applied to a bicycle tire.

The tire wheel A comprises a tire shell 1, a rim 2, and a filling material 3 (4).

The tire shell 1 is a rubber tire manufactured through ordinary steps. For example, the tire shell 1 is obtained by thinly covering a cord fabric with a rubber, forming the rubber-covered fabric into a doughnut shape, and forming on the carcass a tread for improving road surface gripping.

During the steps for forming the tire shell 1, a pair of bead wires 11 are disposed in the doughnut having a U-shaped cross section at both edges thereof, i.e., on both sides of the opening. The bead wires 11 are wound around and fixed to the carcass to thereby serve also to transfer the force generated in the tire to bead parts 1*a* and then to the rim 2.

The tire shell 1 is supported on the rim 2, with the bead parts 1*a* being pressed against the rim 2. This rim 2 is an ordinary product of the size corresponding to that of the tire shell 1. When the tire shell 1 is fitted into the rim 2, a ring-form inner space 4 is formed.

The filling material 3 with which this inner space 4 is filled is an elastic foam in a compressed state. The filling material 3, when in a free state at the atmospheric pressure without an external force, has a larger sectional area than the inner space 4. This filling material 3 is compressed and forcibly fitted into the inner space 4. If a filling material is merely fitted into the inner space 4 without being compressed, gaps result between the filling material 3 and the tire shell 1 because the cross-sectional shape of the inner space 4 is not completely the same as that of the filling material 3. As a result, such a tire has unevenness of cushioning property. In contrast, in the case where the filling material 3 is fitted in a compressed state, not only the tire is free from such gaps, but also the gas contained in the elastic foam is compressed, resulting in an increased impact resilience and reduced rolling resistance. Because of the above, the filling material 3 in a free state has a larger size than the inner space 4. Specifically, the filling material 3 preferably has such a size that it is fitted into the inner space 4 while being compressed at a degree of compression of from 10% to 50%. If the degree of compression thereof is below 10%, the filling material 3 poorly fits into the tire shell 1, resulting not only in impaired cushioning properties but also in a drawback that the tire shell 1 and the filling material 3 rub against each other during running. On the other hand, if the degree of compression thereof exceeds 50%, not only it is difficult to fit the filling material 3 into the tire shell 1, but also the filling material 3 becomes too rigid, resulting in impaired cushioning properties and an uncomfortable ride feeling, although the tire has reduced rolling resistance.

The filling material 3 is obtained by molding a rod-shaped body 3*a* having a nearly circular cross section, cutting this semi-finished part into a proper length, and adhesive-bonding both ends of the cut semi-finished part to have a ring form corresponding to the tire size. This technique enables mass production of such filling materials corresponding to various tire sizes.

In this embodiment, the rod-shaped body 3*a* is obtained by molding and vulcanization in a mold. This production method is advantageous in that the filling material obtained has a cell-free thin rubber layer 31 as the surface coat layer and the cells of the elastic foam are present only in the inside 32 (FIG. 2). If cells are present in the surface layer, the gas passes off through the cells during long-term use and, as a result, the filling material 3 may lose an impact resilience because of drop in pressure. This problem can be eliminated by the thin rubber layer 31 with which the surface of the filling material is wholly coated. Thus, satisfactory results are obtained. In addition, since both cut surfaces of the cut rod-shaped body 3*a* which have exposed cells are adhesive-bonded to each other to form a ring shape, the surface of the resulting filling material is wholly covered with the smooth thin rubber layer 31 and the gas contained in the elastic foam is prevented from passing off. In FIG. 1, the thin rubber layer 31 of the filling material 3 is not shown.

The filling material 3 consists of an elastic foam containing butyl rubber or a halogenated butyl rubber and having a closed-cell structure (a closed-cell type elastic foam) with a water absorption as determined by the water absorption test prescribed in ASTM D1056 of 5% or lower with the exception of the thin rubber layer 31 which is formed on the surface of the filling material. This filling material 3 is produced by, for example, a method comprising adding a foaming agent, a stabilizer, a crosslinking agent, etc. to a solid comprising butyl rubber or a halogenated butyl rubber, kneading the mixture, and then heating the kneaded mixture to foam molding, or a method in which a foaming agent, a stabilizer, a crosslinking agent, etc. are likewise added to a rubber latex, and this mixture is cast, foamed and vulcanized, and then dried.

For producing a butyl rubber (including a halogenated butyl rubber) elastomer in which almost 100% of its cells are closed cells, foam molding is carried out by two-stage vulcanization using molds. The following is a brief explanation of this process.

1) The first vulcanization is conducted in the first mold to a degree of vulcanization of about from 30 to 50% at a temperature (100–140° C.) lower than the decomposition point of the foaming agent. This step enables the formation of cell walls which do not break under foaming pressure.

2) The second vulcanization is conducted in the second mold, in which the rubber is foamed and simultaneously vulcanized to a degree of vulcanization of from 90 to 100% at a temperature (150–180° C.) at which the foaming agent decomposes. The transfer to the second mold makes it possible to obtain the desired dimensions.

A representative formulation for a composition for producing the filling material 3 is shown in Table 1.

TABLE 1

Representative formulation for filling material

| Ingredient | Parts by weight |
|---|---|
| Rubber ingredient | 100 |
| Vulcanizing agent | 1–3 |
| Vulcanization accelerator | 1–4 |
| Antioxidant | 1–3 |
| Foaming agent | 4–10 |
| Stabilizer | 2–5 |
| Filler | 30–50 |
| Plasticizer | 0–20 |

Examples of the rubber ingredient given in Table 1 include butyl rubber and halogenated butyl rubbers such as brominated and chlorinated butyl rubbers. Butyl rubber has low gas permeability, so that the gas enclosed in the closed cells of the elastic foam constituting the filling material 3 is less apt to pass off and cushioning properties can be maintained over long. On the other hand, materials other than butyl rubber and halogenated butyl rubbers (such as EPDM, natural rubber), although they can form closed cells, are apt to cause gas leakage. Accordingly, when the inner space is filled with the filling material made from such a material in a compressed state, the filling material (donut-shaped) becomes thin soon. As the results, an impact resilience due to gas can not be obtained.

Moreover, butyl rubber has high shock absorption and is chemically stable and excellent in weatherability and heat resistance. Hence, butyl rubber is suitable for use in a filling material to be fitted into bicycle tires. Brominated butyl rubber and chlorinated butyl rubber not only have the same advantages as butyl rubber, but are advantageous in that they can be vulcanized more rapidly than butyl rubber.

Examples of the vulcanization agent include inorganic substances such as powdery sulfur, colloidal sulfur, and insoluble sulfur. Examples of the vulcanization accelerator include zinc white, magnesium oxide, slaked lime, thiazole compounds such as 2-mercaptobenzothiazole (MBT), dithioic acid salts such as zinc dimethyldithiocarbamate (PZ), and thiuram compounds such as tetramethylthiuram monosulfide (TMTM). Examples of the antioxidant include trimethyldihydroquinones and phenylenediamine and derivatives thereof. Examples of the foaming agent include inorganic foaming agents such as ammonium carbonate and sodium bicarbonate and organic foaming agents such as nitroso compounds, sulfohydrazide compounds, and azo compounds. Examples of the stabilizer include inorganic salts such as tribasic lead sulfate, metal soaps such as basic lead stearate, and dibutyltin laurate. Examples of the filler include carbon black, calcium carbonate, and clay. Examples of the plasticizer include DOP, DBP, DIDP, fatty esters, and paraffinic process oils. The composition for use in forming the filling material 3 may further contain an ultraviolet absorber, an antistatic agent, a reinforcement, etc.

The filling material 3 in a free state has an apparent specific gravity ρ of from 0.08 to 0.30, which is obtained by regulating the expansion ratio thereof to from 3.5 to 13.0 by controlling the incorporation of a foaming agent. Consequently, this filling material is considerably lightweight as compared with a commercially available EPDM filling material of the same size for puncture-free tires, which has an apparent specific gravity ρ of 0.4 or larger. If the free-state apparent specific gravity ρ of the filling material 3 is below 0.08, this filling material, even after compressed and fitted into the inner space 4, still has a too small apparent specific gravity. As a result, the gas pressure within the cells is not increased sufficiently by the compression, so that the filling material remains soft and has impaired cushioning properties. For example, a tire wheel containing such a filling material fitted into its inner space shows almost the same behavior as that of a punctured air-filled tire wheel. On the other hand, if the apparent specific gravity ρ thereof exceeds 0.30, not only the filling material 3 becomes too heavy, but the filling material itself becomes so rigid that the tire wheel containing this filling material fitted into its inner space 4 has impaired cushioning properties. The preferred range of the apparent specific gravity ρ of the filling material is from 0.1 to 0.3. In the case where this filling material 3 is applied to a 26-inch bicycle, the weight of the filling material 3 is from 210 g to 350 g per wheel, so that the proportion of the weight of this filling material in the weight of the whole bicycle is small. Thus, the tire wheels can combine a puncture-free function and a small weight.

The filling material 3 described above has a freestate impact resilience of from 50 to 80 (JIS K-6301). If the impact resilience thereof is lower than 50, increased rolling resistance results. If the impact resilience thereof exceeds 80, the ease of fitting of a tire on a rim is sacrificed and the durability is impaired. With respect to the commercially available polyurethane or EPDM filling materials for puncture-free tires, their impact resilience in a free state is below 50. In the present invention, since the filling material 3 fitted into the inner space 4 is preferably in a compressed state at a degree of compression of at least 10% based on its free-state volume, the gas enclosed in the closed cells is compressed and this brings about a further increased impact resilience, as described hereinabove.

The hardness of the filling material 3 in a free state is in the range of from 20 degrees to below 40 degrees. This hardness means the ASKER type C hardness prescribed in Japan Rubber Association Standards SRIS-0101. If the hardness thereof is lower than 20 degrees, the tire wheel A containing this filling material 3 fitted thereinto is so soft that it not only has the poor cushioning properties, but also has increased rolling resistance because of an increased ground contact area. On the other hand, if the hardness of the filling material 3 is 40 degrees or higher, the filling material 3 is so rigid that it shows no shock absorption and has impaired cushioning properties.

Besides the tire shell 1, rim 2, and filling material 3 described above, other components of the tire wheel A include spokes, a hub, and an axle. Such other components are the same as ordinary parts and, hence, explanations thereof are omitted herein.

(2) Performance Test

In order to ascertain the performances of tire wheels A having the above-described constitution, the tire wheels were examined for ride feeling, rolling resistance, etc. Three kinds of filling materials 3, α, β, and γ, were used in this test, which were formed according to the formulations shown in Table 2.

TABLE 2

| Formulation for filling material | | | |
|---|---|---|---|
| Raw material | α | β | γ |
| Butyl rubber | 100 | — | — |
| Brominated butyl rubber | — | 100 | — |
| Chlorinated butyl rubber | — | — | 100 |
| Carbon black | 30 | 30 | 30 |
| P-process oil | 10 | 10 | 10 |
| Zinc white | 5 | 3 | 3 |
| Stearic acid | 2 | 2 | 2 |
| 2,2-Methylenebis(4-methyl-6-t-butylphenol) | 2 | 2 | 2 |
| Tetramethylthiuram disulfade (TMTD) | 1.5 | — | — |
| Benzothiazyl disulfide (MBTS) | — | 1.0 | 1.0 |
| 2-Mercaptobenzothiazole (MBT) | 1 | — | — |
| Sulfur | 1.5 | 0.5 | 0.5 |
| Foaming agent, DPT (dinitroso-pentamethylenepentamine-tetramine) | 4 | 4 | 4 |
| Foaming aid (urea compound) | 4 | 4 | 4 |
| Total | 161.0 | 156.5 | 156.5 |

The tire wheels A used in this test each was a wheel for 26-inch standard bicycles, and the inner space 4 thereof had a cross-sectional area of about 700 $mm^2$. The ring-form filling materials 3 each had a circular cross section having a diameter of 35 mm, so that they were compressed at a degree of compression of about 37%. These filling materials 3 had an apparent specific gravity ρ of 0.11 (Examples 1 to 3) or 0.15 (Examples 4 to 6). These filling materials 3 were compared with a commercially available EPDM filling material (Comparative Example 1) and an air-filled tire (Comparative Example 2). The tire shells 1 and the rims 2 used were test-use tires and rims produced by Inoac Corporation.

Bicycles were actually ridden on to evaluate the ride feeling thereof. As a result, the bicycle employing the air-filled tires and that employing the tire wheels containing the filling material 3 having an apparent specific gravity ρ of 0.15 (Examples 4 to 6) gave a satisfactory ride feeling. Table 3 summarizes the results, which are given in five grades based on the feeling of the riders (the larger the number, the better the property). The standard marks are 3 and the larger numbers.

Specifically, ten riders played slalom through pylons standing at an interval of 2 m and then rode across square timbers 3 cm high placed at an interval of 1 m. Each rider evaluated the ride feeling in five grades, and the average thereof was rounded.

The bicycles were also evaluated for vibration-absorbing property, controllability, and lightweight property by the same method. The results obtained are shown in Table 3.

TABLE 3

| Test results | ρ = 0.11 Example | | | ρ = 0.15 Example | | | Comp. Example | |
|---|---|---|---|---|---|---|---|---|
| | 1 | 2 | 3 | 4 | 5 | 6 | 1 | 2 |
| Kind of filling material | α | β | γ | α | β | γ | — | — |
| Ride felling | 4 | 4 | 4 | 5 | 5 | 5 | 3 | 5 |
| Vibration-absorbing property | 4 | 4 | 4 | 5 | 5 | 5 | 3 | 5 |

TABLE 3-continued

| Test results | ρ = 0.11 Example | | | ρ = 0.15 Example | | | Comp. Example | |
|---|---|---|---|---|---|---|---|---|
| | 1 | 2 | 3 | 4 | 5 | 6 | 1 | 2 |
| Controllability | 4 | 4 | 4 | 5 | 5 | 5 | 3 | 5 |
| Lightweight property | 5 | 5 | 5 | 4 | 4 | 4 | 2 | 5 |

Figure 4:
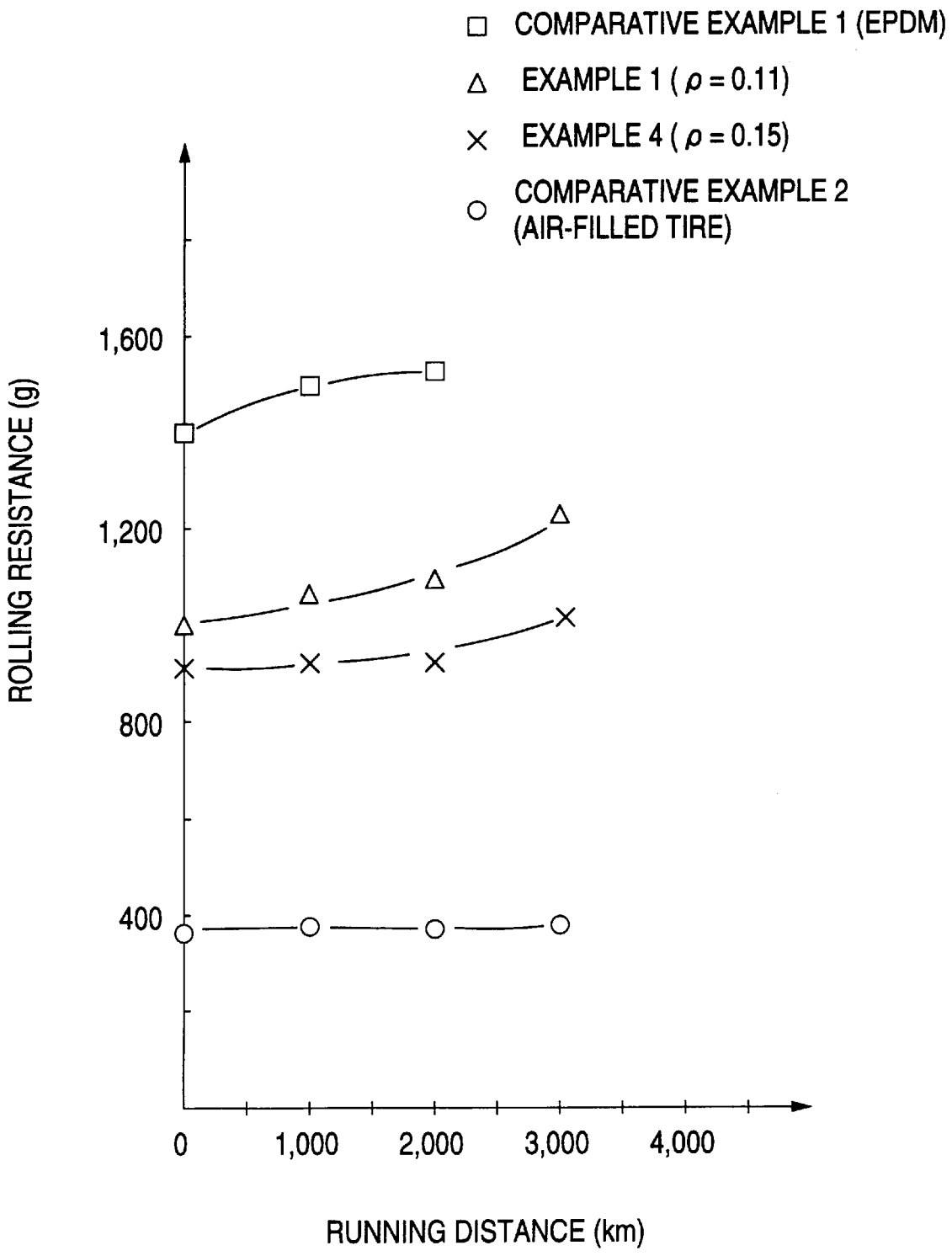
FIG. 4 is a graph in which tire wheels according to the present invention are compared in rolling resistance with an air-filled tire and a tire wheel employing an EPDM filling material.

Rolling resistance was measured by the following method. Each tire wheel to be tested was pressed against a drum having a diameter of 760 mm, and the wheel was rotated at a constant rate (30 km/h) while applying a load of 50 kgf thereto. Thereafter, the driving force which had been applied to the drum was removed to allow the wheel to run, and the distance over which the wheel could run was measured, which distance was converted to a value of rolling resistance. The results obtained are shown in FIG. 4, where the running distance is plotted as abscissa. It was found that although the tire wheels of Examples 1 and 4 according to the present invention had slightly higher rolling resistances than the air-filled tire (Comparative Example 2), these tire wheels can be sufficiently put to practical use.

(3) Degree of Compression of Filling Material

Although the inner space 4 is filled with the filling material 3 in a compressed state, the influence of differences in the degree of compression on the fitting of tires (tire shells 1 and filling materials 3) into rims 2 was examined. As a result, the following were found.

When the degree of compression was 3 or 8%, bead shifting occurred and the tires were not fitted in their proper position, resulting in an uncomfortable ride feeling. When the degree of compression was 11%, bead shifting did not occur and the tires were satisfactorily fitted. When the degree of compression was 54%, it was very difficult to fit the filling material 3 into the inner space. When the degree of compression was 49%, a sign thereof was shown. As a result of various examinations, a preferred range of the degree of compression is from 10 to 50%, with more preferred range being from 20 to 40%. As the degree of compression becomes smaller than the lower limit of the preferred range, although it becomes easy to fit the filling material 3 into the inner space surrounded by the rim 2 and the tire shell 1, the inner surface of the tire shell and the filling material 3 come to rub against each other and the thin rubber layer 31 of the filling material may be worn away. On the other hand, as the degree of compression becomes greater than the upper limit of the preferred range, it becomes difficult to fit the filling material 3 into the inner space surrounded by the rim 2 and the tire shell 1.

(4) Apparent Specific Gravity of Filling Material

When the degree of compression of the filling material 3 was set within the range from 10 to 50% and the apparent specific gravity ρ of the filling material 3 varied, the characteristics of the filling material with which the inner space 4 of tire wheel is filled was examined. As a result, the following were found.

The filling material having an apparent specific gravity ρ of 0.07 was too soft and had high rolling resistance, making bicycle riding laborious. The filling materials having apparent specific gravities ρ of 0.11 and 0.15 gave satisfactory results with a comfortable ride feeling. The filling material having an apparent specific gravity of 0.4 showed a low shock-absorbing effect of the compressed gas enclosed in the cells, so that it had a low impact resilience and was unable to absorb shocks caused by road surfaces.

(5) Effects of Examples

According to the tire wheels A of the Examples of this invention, since the filling material 3 having cushioning properties is fitted, in a compressed state, into the tire shell 1, the tire shell 1 always retains an expanded shape due to the filling material 3 and does not suffer a puncture. Namely, because the tire wheels are not of the air-filled type, the tire shell does not suffer puncturing even when it is pierced with small holes. As a result, accidents tend to be prevented and the tire wheels A eliminate the necessity of troublesome puncture mending.

As apparent from the results of the performance test, the tire wheels A are almost comparable to the air-filled tire in that they are lightweight and give a comfortable ride feeling. They have a moderate impact resilience and a low running resistance, so that bicycles employing the tire wheels A can be ridden lightly. Due to butyl rubber, a brominated butyl rubber or a chlorinated butyl rubber contained in the elastic foam, the foam retains its closed-cell structure over long and buffs shocks caused by road surfaces. Moreover, the bicycles employing the tire wheels A not only have high controllability with respect to changing and maintaining directions, but also are lightweight and easily handleable.

The present invention is not construed as being limited to the embodiments described above, and various modifications suitable for purposes and applications can be made within the scope of the invention. Besides the bicycles to which the above embodiments were applied, the present invention is also applicable to motor bicycles, carts, agricultural vehicles, wheelchairs, and the like. Although the rod-shaped body 3*a* was formed into a ring shape by adhesive bonding, a ring-form filling material 3 can be produced by molding only.

As described above, the tire wheel according to the present invention not only enables bicycles to be free from puncturing due to the puncture-free structure thereof, but also is lightweight, provides a comfortable ride feeling, has low rolling resistance, and can maintain these performances over long. Consequently, the tire wheel of the invention is highly effective in improving the quality and performances of bicycles and in other respects.

While the invention has been described in detail and with reference to specific embodiments thereof, it will be apparent to one skilled in the art that various changes and modifications can be made therein without departing from the spirit and scope thereof.

What is claimed is:

1. A tire wheel comprising a tire shell having bead parts, a rim on which the tire shell is supported with the bead parts being pressed against the rim, and a filling material disposed in a ring-form inner space surrounded by the rim and the tire shell, said filling material having an apparent specific gravity in a free state of from 0.08 to 0.3 and an impact resilience of from 50 to 80 as determined by JIS K-6301, in a free state, said filling material consisting of an elastic foam consisting essentially of butyl rubber and having a closed-cell structure with a water absorption as determined by the water absorption test prescribed in ASTM D1056 of 5% or lower, said filling material being in a compressed state at a degree of compression from 10% to 50%, and said filling material being produced by the steps comprising conducting a first vulcanization in a first mold at a vulcanization time at which a degree of vulcanization reaches a range of from 30% to 50% with respect to a vulcanization curve at a temperature lower than a decomposition point of a foaming agent, foaming the rubber thereof at a temperature at which the foaming agent decomposes to conduct a second vulcanization in a second mold to provide a foamed filling material in which substantially 100% of the cells are closed cells, and releasing the second mold, wherein the foaming agent is dinitroso-pentamethylene-tetramine.

2. A tire wheel comprising a tire shell having bead parts, a rim on which the tire shell is supported with the bead parts being pressed against the rim, and a filling material disposed in a ring-form inner space surrounded by the rim and the tire shell, said filling material being in a compressed state, said filling material consisting of an elastic foam consisting essentially of butyl rubber, and said filling material being produced by the steps comprising conducting a first vulcanization in a first mold at a vulcanization time at which a degree of vulcanization reaches a range of from 30 to 50% with respect to a vulcanization curve at a temperature lower than a decomposition point of a foaming agent, foaming the rubber thereof at a temperature at which the foaming agent decomposes to conduct a second vulcanization in a second mold to provide a foamed filling material in which substantially 100% of the cells are closed cells, and releasing the second mold, wherein the foaming agent is dinitroso-pentamethylene-tetramine.

* * * * *